United States Patent [19]
Miyajima

[11] Patent Number: 5,891,483
[45] Date of Patent: Apr. 6, 1999

[54] AUTOMATIC MOLDING MACHINE USING RELEASE FILM

[75] Inventor: Fumio Miyajima, Togura-machi, Japan

[73] Assignee: Apic Yamada Corp., Nagano, Japan

[21] Appl. No.: 697,299

[22] Filed: Aug. 21, 1996

[30] Foreign Application Priority Data

Aug. 23, 1995 [JP] Japan .................................... 7-215078
Aug. 23, 1995 [JP] Japan .................................... 7-215080
Sep. 20, 1995 [JP] Japan .................................... 7-241456

[51] Int. Cl.[6] ......................... B29C 31/08; B29C 33/68; B29C 45/02; B29C 45/14
[52] U.S. Cl. ..................... 425/89; 264/272.17; 264/316; 425/116; 425/121; 425/544; 425/556; 425/588
[58] Field of Search .............................. 425/89, 116, 121, 425/122, 129.1, 544, 556, 588, 572, 436 R, 436 RM, DIG. 228; 264/272.17, 316

[56] References Cited

U.S. PATENT DOCUMENTS

| | | | |
|---|---|---|---|
| 3,368,242 | 2/1968 | Loewenfeld et al. | 425/89 |
| 4,559,192 | 12/1985 | O'Malley | 425/89 |
| 4,605,528 | 8/1986 | Petitcollin et al. | 264/316 |
| 4,741,787 | 5/1988 | Shimizu et al. | 264/272.17 |
| 4,872,825 | 10/1989 | Ross | 264/272.17 |
| 4,915,607 | 4/1990 | Medders et al. | 264/272.17 |
| 5,123,823 | 6/1992 | Banjo et al. | 264/272.17 |
| 5,268,136 | 12/1993 | Girard et al. | 264/316 |
| 5,297,897 | 3/1994 | Venrooij et al. | 425/121 |
| 5,431,854 | 7/1995 | Pas | 425/DIG. 228 |
| 5,478,517 | 12/1995 | Erdos | 425/126.1 |
| 5,654,017 | 8/1997 | Harmsen | 43/116 |

FOREIGN PATENT DOCUMENTS

| | | | |
|---|---|---|---|
| 0 665584 | 1/1995 | European Pat. Off. | |
| 1504777A | 11/1969 | Germany. | |
| 59-72734 | 4/1984 | Japan | 425/129.1 |
| 63-15715 | 1/1988 | Japan | 425/116 |
| 6-29333 | 2/1994 | Japan | 425/116 |

OTHER PUBLICATIONS

JP 59 215847A, Dec. 5, 1984, Abstract.
JP 02 102029A, Apr. 13, 1990, Abstract.
JP 03 150117A, Jun. 26, 1991, Abstract.
JP 02 063836A, Mar. 5, 1990, Abstract.
JP 03 272848A, Dec. 4, 1991, Abstract.
JP 03 155908A, Jul. 3, 1991, Abstract.
JP 07 047596A, Feb. 21, 1995, Abstract.

Primary Examiner—Robert Davis

[57] ABSTRACT

The automatic molding machine of the present invention comprises: molding dies; a press mechanism to which the molding dies are attached, the press mechanism clamping and molding a work piece which is set in the molding die; a film feeding mechanism linking with molding action of the press mechanism, the film feeding mechanism feeding release film, which is formed into a long belt form, prescribed length so as to correspond a setting position of the work piece, which is set in the molding die; and a conveying mechanism linking with the molding action of the press mechanism, the conveying mechanism feeding the work piece and resin for molding into the molding die and taking out a molded product therefrom, wherein the work piece is molded by the molding dies whose molding sections are covered with the release film.

18 Claims, 14 Drawing Sheets

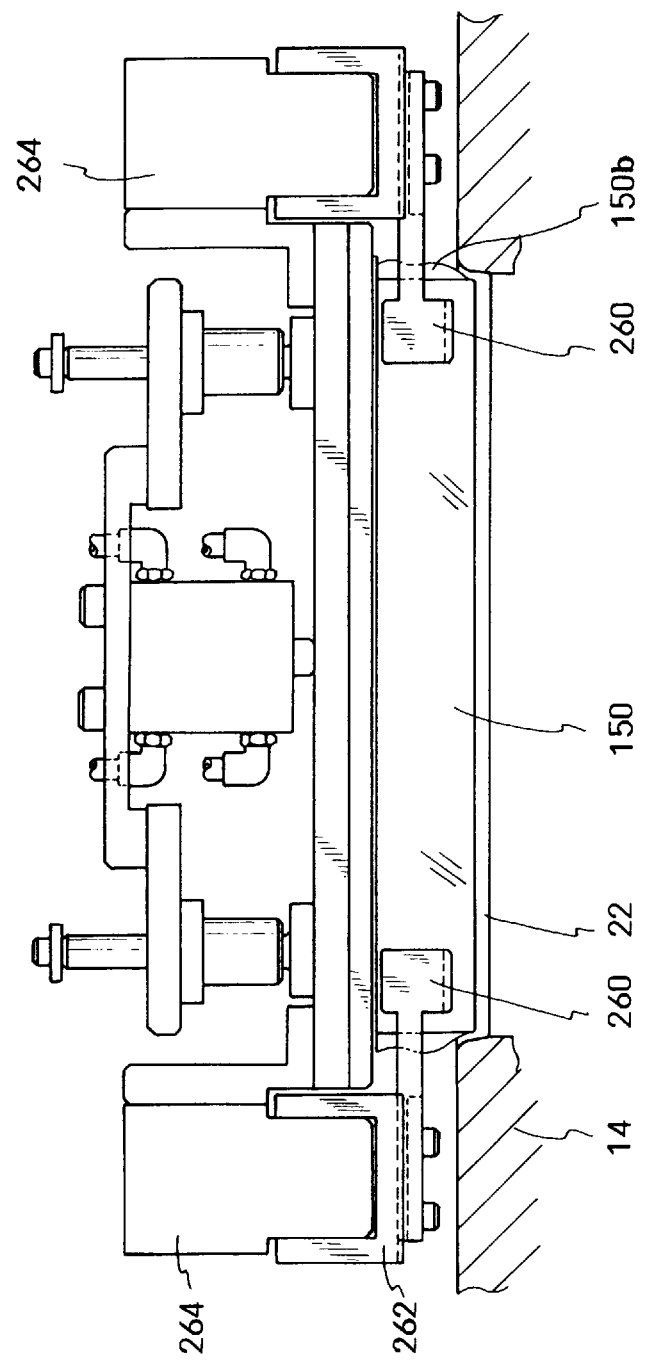

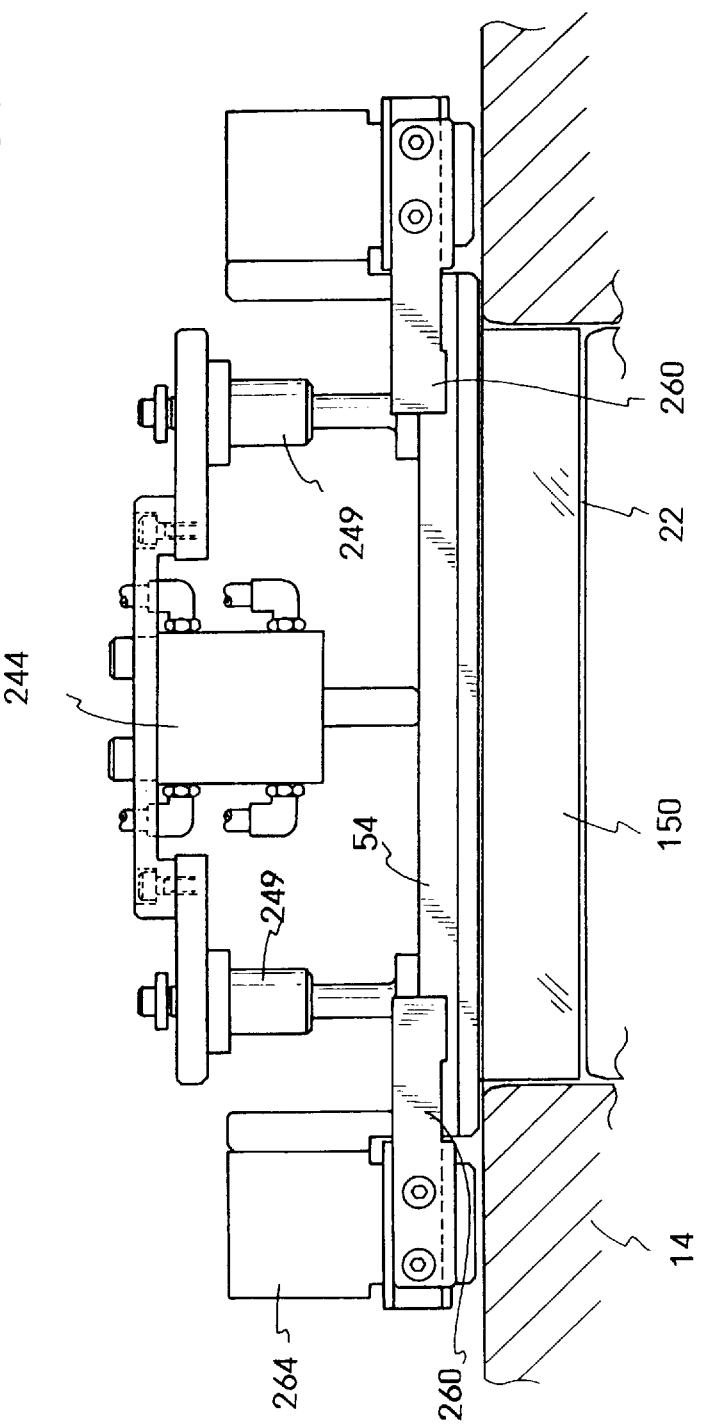

AUTOMATIC MOLDING MACHINE USING RELEASE FILM

BACKGROUND OF THE INVENTION

The present invention relates to an automatic molding machine, which is capable of molding resin-mold type semiconductor devices with release film.

Conventionally, automatic transfer molding machines have been used so as to manufacture the resin-mold type semiconductor devices, e.g., PLCC, QFP. In the conventional automatic molding machine, molding dies, which include cavities, are set in a press mechanism, and work pieces and resin tablets are automatically set in the molding dies, then the work pieces are molded with the resin.

In the case of molding lead frames, which are formed into rectangular strips, as the work pieces, a magazine in which a plurality of lead frames have been accommodated is set in the molding machine, and the lead frames are automatically fed onto the molding dies, then they are molded with the resin. After the molding, the molded products are taken out from the molding dies, and disused resin is removed, then the products are accommodated in a tray, etc.

In the conventional molding machine, the melted resin directly contacts inner faces of the molding sections of the molding dies and solidifies in the molding dies. So, the ejector pins are provided in the molding dies. The ejector pins eject the molded products from the molding dies when the molding dies are opened.

These days, semiconductor elements of the semiconductor devices have unique high-frequency characteristics and their consumption of electricity is very great, so the resin-mold type semiconductor devices must be manufactured on the basis of said characteristics, etc. In the resin-mold type semiconductor devices, the resin affects said characteristics, etc. of the semiconductor elements, so selection of the resin is a very important factor.

In the case of employing the semiconductor element whose calorific value is great, for example, the resin having high thermal conductivity, e.g., the resin including heat-resisting ceramic fillers: alumina, etc. whose thermal conductivity is high, is used. However, the resin including the ceramic fillers abrades the molding dies. So gates of the molding dies are rapidly abraded, and finally the molding dies cannot be used.

And, these days thin semiconductor devices are required. But, in the case of molding the semiconductor device having a thin package section, it is very difficult to fill the resin in the cavity spaces, so that voids and non-filled parts are formed in the molded package section. With a small package section, pitch of the wire bonding sections of the lead frame is very narrow, so electric wires are swept by the resin flow passing therethrough. To avoid the wire sweep, the resin having high fluidity is used, but the resin having high fluidity is apt to invade into sliding parts of the ejector pins and a plunger. By the resin invasion, the sliding parts cannot move, and the melted resin which leaks on the parting faces of the molding dies makes the molding dies and the molded products dirty.

To solve the above described disadvantages of the conventional automatic molding machine, a molding method using release film has been invented. In this method, heat-resisting soft film, which is capable of easily peeling off from the solidified resin, is used as release film. Inner faces of the molding sections, e.g., the cavities, of the molding dies are covered with the release film, so that the resin is capable of molding without direct contact with the faces of the molding dies.

The molding method using the release film is shown in FIG. 15. On the left side of a center line L, a state of not filling the resin in the cavity space is shown; on the right side of the center line L, a state of filling the resin in the cavity space is shown. A work piece 204 is clamped by an upper die 200 and a lower die 202, which are the molding dies. Resin 208 is introduced from a pot 206 to the cavity space 210 to mold the work piece 204. Two sheet of the release film 212a and 212b are spread along inner faces of the cavities, etc., and they cover over the parting faces of the upper die 200 and the lower die 202. In this state, the melted resin is filled in the cavity space 210.

Note that, in this method, wrapped resin 150, in which the resin for molding is tightly wrapped with heat-resisting wrapping film which also acts as the release film, is used as the resin for molding the work piece 204. A perspective view of the wrapped resin 150 is shown in FIG. 16. The wrapped resin 150 is tightly wrapped with upper film and lower film. Edges of the upper film and the lower film are mutually sealed to form the wrapping film 151. The wrapped resin 150 is supplied into the pot 206 in a wrapped state to melt. Sealed parts of the wrapping film 151 are partially opened when a plunger 206a exerts pressure on the melted resin 208. Since the sealed edges of the wrapping film 151 are partially opened as a resin path, the melted resin 208 can be introduced into the cavity space 210 from the pot 206.

In the case of the molding method using the release film, the resin does not directly contact the faces of the molding dies, so the abrasion in the gates, the cavities, etc. of the molding dies can be prevented. Thus, any types of the resin can be used in the molding dies. And, the release film exists between the molding dies and the molded products, so the molded products can be easily ejected from the molding dies. Thus, structures of the molding dies can be simpler because no ejector pins are required therein. Since the faces of the molding dies are covered with the release film, no resin invades into small gaps in the molding dies even if the resin has high fluidity.

In the method using the release film, any types of resin can be employed, so the most proper resin can be selected according to characteristics, etc. of products.

SUMMARY OF THE INVENTION

An object of the present invention is to provide an automatic resin molding machine, which executes said molding method using the release film.

To achieve the object, the present invention has the following structures. The automatic molding machine of the present invention, comprises:

molding dies;

a press mechanism to which the molding dies are attached, the press mechanism clamping and molding a workpiece which is set in the molding die;

a film feeding mechanism linking with molding action of the press mechanism, the film feeding mechanism feeding release film, which is formed into a long belt form, prescribed length so as to correspond a setting position of the work piece, which is set in the molding die; and a conveying mechanism linking with the molding action of the press mechanism, the conveying mechanism feeding the work piece and resin for molding into the molding die and taking out a molded product therefrom, wherein the work piece is molded by the molding dies whose molding sections are covered with the release film.

In the automatic molding machine, the conveying mechanism may include a feeding head whose moving direction is perpendicular to or parallel to the feeding direction of the release film, which is fed by the film feeding mechanism.

In the automatic molding machine, the conveying mechanism may include:

a work feeding head for feeding the work piece in the molding die;

a resin feeding head for feeding the resin into a pot of the molding die; and a product take-out head for taking out the molded product from the molding die.

In the automatic molding machine, the resin may be supplied from a magazine, in which the resin has been accommodated, to the resin feeding head by a resin feeding mechanism. In the case of using the wrapped resin, the automatic molding machine may further comprise a film forming mechanism for forming an extended section of the wrapping film of the wrapped resin flatwise.

In the automatic molding machine, the resin feeding head may include means for holding the resin of the wrapped resin to precisely supply the wrapped resin in the pot when the wrapped resin is held by the resin feeding head.

In the automatic molding machine, the film feeding mechanism may include:

feeding reels respectively feeding the release film to the upper die and lower die; and collecting reels respectively collecting the disused release film from the upper die and lower die, or the film feeding mechanism may collect the disused release film in an accommodating section, e.g., a box, without winding around a reel.

In the automatic molding machine, the film feeding mechanism may include a feeding head capable of pinching the release film and reciprocatively moving in the direction of feeding film to feed the release film, or a pinch roller, which is provided on the film feeding side and capable of feeding the release film.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described by way of examples and with reference to the accompanying drawings which are given by way of illustration only, and thus are not limitative of the present invention, and in which:

FIG. 7 is a front view of a state of setting the wrapped resin in a pot;

FIG. 9 is a front view of a state of completing to set the wrapped resin in the pot;

DETAILED DESCRIPTION OF THE PREFERRED EMBODIMENTS

Preferred embodiments of the present invention will now be described in detail with reference to the accompanying drawings.

First Embodiment

Figure 1:
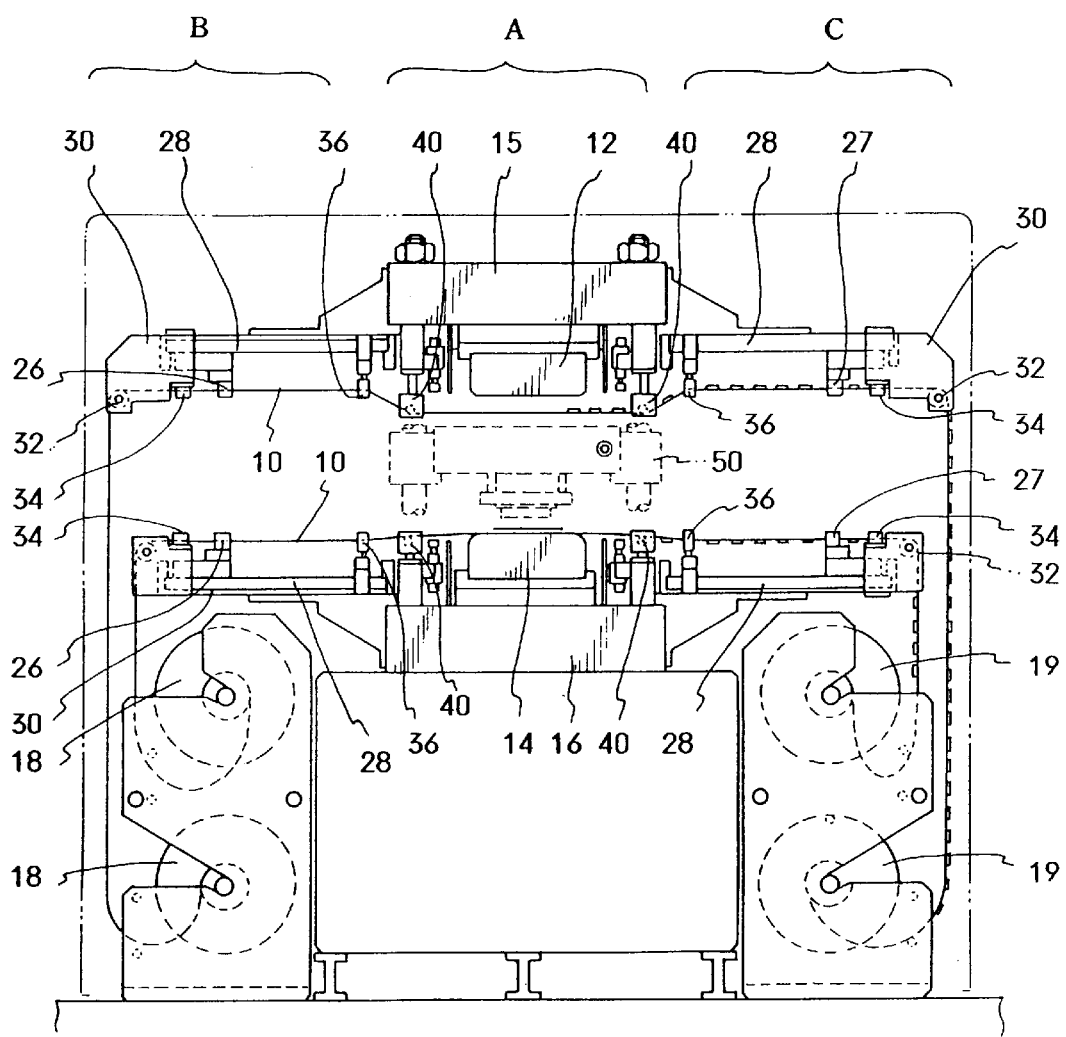
FIG. 1 is a front view of the automatic molding machine of the First Embodiment.
Figure 2:
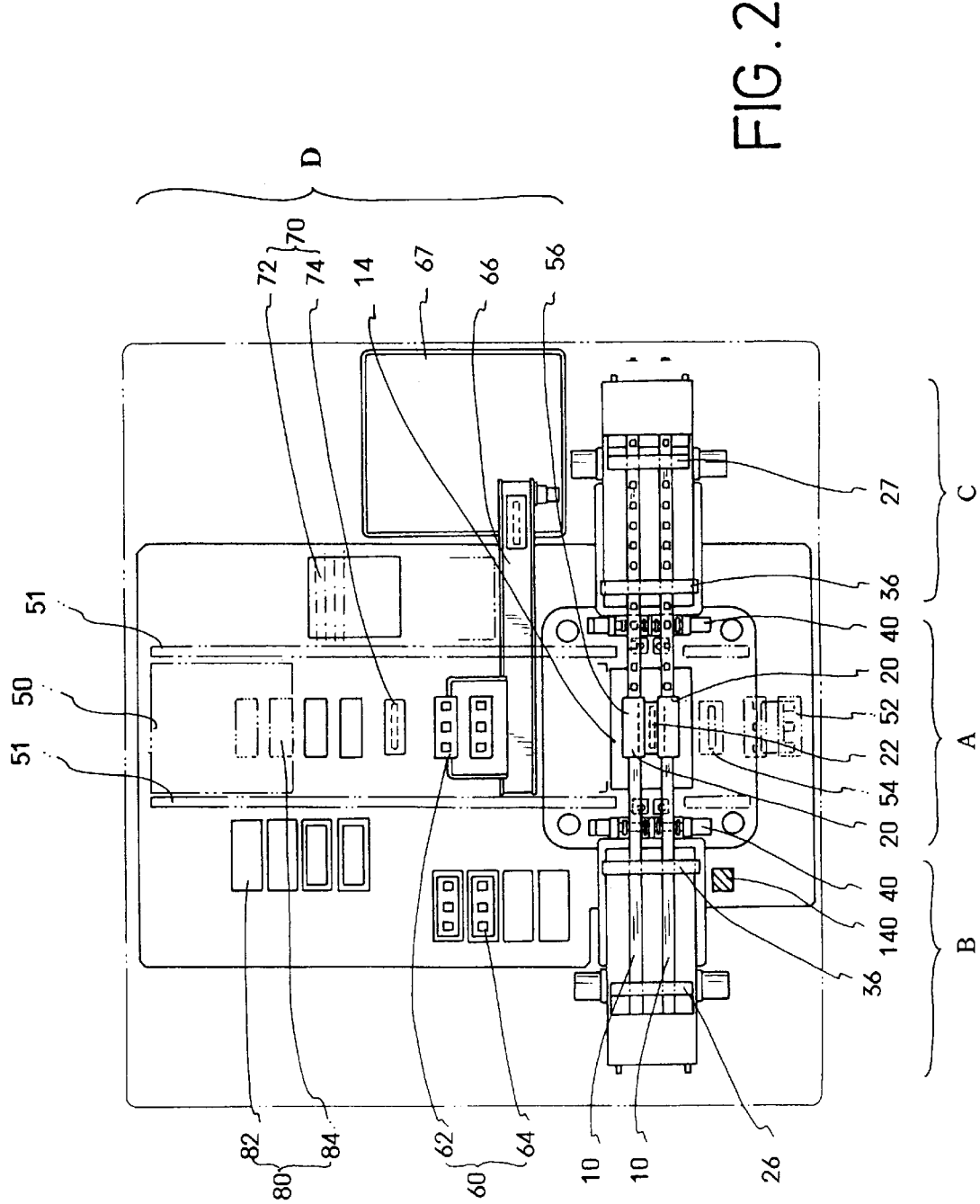
FIG. 2 is a plan view of the automatic molding machine of the First Embodiment.

FIG. 1 is a front view of an automatic molding machine of the First Embodiment of the present invention; FIG. 2 is a plan view thereof. The molding machine comprises: a press mechanism for molding work pieces; a film feeding mechanism, which links with the molding action of the press mechanism and feeds the release film to the press mechanism; and a conveying mechanism for feeding the work pieces to and taking out molded products from the molding dies.

In FIGS. 1 and 2, a part A is the press mechanism; parts B and C constitute the film feeding mechanism; a part D is the conveying mechanism.

In FIG. 1, the release film 10 is sent rightward from the film feeding section B, which is provided on the left side of the press mechanism A, to the film collecting section C, which is provided on the right side thereof, via the press mechanism A. As shown in FIG. 2, the conveying mechanism D is arranged in the direction perpendicular to the feeding direction of the release.

(THE PRESS MECHANISM)

The press mechanism A has a press unit to which molding dies, which are capable of clamping and molding the work pieces, are attached. An upper die 12 and a lower die 14, which are molding dies for molding the work pieces, are attached to the press unit as well as the conventional transfer molding machine.

In the present embodiment, the upper die 12 is fixed to a fixed platen 15; the lower die 14 is fixed to a movable platen 16. The movable platen 16 is connected to a press ram of the press unit. So the movable platen 16 is moved in the open-close direction of the molding dies along tie bars, which are fixed to a base of the molding machine, by the press ram. With this structure, the upper die 12 and the lower die 14 can be opened and closed.

In the present embodiment, lead frames 20, which are formed into rectangular strip shapes, are molded as the work pieces. As shown in FIG. 2, two work pieces 20 are respectively set on each side of a pot 22 of the molding die. Two sheets of the long release film 10, which are formed into wide belts, are fed in the right-left direction in FIG. 2. The work pieces 20 are set on the molding die and arranged in the right-left direction in FIG. 2. Two sheets of the release film 10 are arranged according to the locations of the work pieces 20. Two sheets of the release film 10 are intermittently sent or fed a prescribed length from the feeding section B to the collecting section C.

The pot 22 of the molding die is formed at a position between the work pieces 20 and formed into a long groove. A plunger for exerting melted resin and sending the same from the pot 22 is formed into a long rectangle whose planar shape corresponds to the planar shape of the pot 22. Further, the resin, which is supplied into the pot 22, is also formed into a long stick corresponding to the planar shape of the pot 22. Of course, the shape of the pot 22 is not limited to the long groove, it may be a circular pot or a multiple circular pots, into each of which a columnar resin tablet is supplied, as well as the conventional transfer molding machine.

(THE FILM FEEDING MECHANISM)

The film feeding mechanism links with the molding action of the press mechanism A and feeds new release film 10 to the upper die 12 and the lower die 14. The film feeding mechanism collects the used release film 10 from the molding dies 12 and 14. The used release film 10 may be collected after prescribed times of molding operation are executed, but the used release film 10 is collected and the new release film 10 is fed for each molding operation in the present embodiment.

In FIG. 1, the new release film 10 is wound around feeding reels 18; the used release film 10 is wound around the collecting reels 19. Namely, each sheet of the release film 10, which is formed into a wide long belt, is fed from each feeding reel 18 and collected by winding around each collecting reel 19. In the present embodiment, two reels, i.e., the feeding reel 18 and the collecting reel 19, are provided to the upper die 12; two reels, i.e., another feeding reel 18 and another collecting reel 19, are provided to the lower die 14. The feeding reels 18 and the collecting reels 19 are provided under a main part of the molding machine so as to prevent interference.

As described above, each release film 10 covers over the faces of the upper die 12 and the lower die 14, so that the resin cannot directly contact inner faces of molding sections of the molding dies: the cavities, etc. In the present embodiment, two sheets of the release film 10 are fixed onto the parting faces of the molding dies 12 and 14 by air suction so as not to shift while molding. After the molding, the molded products are peeled off from the release film 10 and taken out from the press mechanism A, then each used release film 10 is wound around the collecting reel 19.

Each release film 10 is intermittently fed the prescribed length, which is equal to the length of clamping of the release film 10 by the molding dies 12 and 14. In the present embodiment, feeding heads 26 and 27 are employed to feed the release film 10 to the prescribed length. The feeding heads 26 and 27 are capable of moving in the direction of feeding the release film 10. The feeding heads 26 and 27 pinch and draw the release film 10. Note that, the feeding head 26 is provided on the feeding side of the release film 10; the feeding head 27 is provided on the collecting side thereof. The feeding heads 26 and 27 are linearly reciprocatively moved, in a prescribed range, by linear servo motors. Fixed members 28 of the linear servo motors are respectively slidably attached to sliding members to which the feeding heads 26 and 27 are respectively provided. The sliding members are capable of reciprocatively moving on the fixed members 28. The movable range of the sliding members on the fixed members 28 defines the drawable length of the release film 10. When the feeding heads 26 and 27 are moved forward (rightward in FIG. 1), they pinch and move the release film 10; when they move backward, they release the release film 10 and freely move with respect to the release film 10.

The fixed member 28 of the upper die 12 is fixed to the fixed platen 15; the fixed member 28 of the lower die 14 is fixed to the movable platen 16 so as to vertically move together with the lower die 14.

Holding arms 30 hold the linear servo motors, etc. The holding arms 30 are extended sideward from both sides of the press mechanism A. The holding arm 30 of the upper die 12 is fixed to the fixed platen 15; the holding arm 30 of the lower die 14 is fixed to the movable platen 16.

Each release film 10 is introduced from the feeding reels 18 to the collecting reels 19 via rollers 32, which are provided to each holding arm 30. Note that, the rollers 32 of the upper die 12 are located slightly on the outer side of the rollers 32 of the lower die 14, so as to prevent the release film 10 of the upper die 12 and that of the lower die 14 from mutual adhesion which is caused by static electricity.

Pinch heads 34 are respectively provided to positions, between the fixed member 28 of the linear servo motor and the roller 32, in the holding arms 30. In the feeding section B, the pinch heads 34 pinch the release film 10 so as to prevent the release film 10 from drawing backward when the feeding head 26 draws the release film 10 and returns to an initial position. In the collecting section C, the pinch heads 34 pinch the release film 10 so as to prevent the release film 10 from drawing backward when the feeding head 27 moves toward the press mechanism A.

Tension rollers 36 are provided to each holding arm 30, and they are located at positions between the fixed member 28 of the linear servo motor and the press mechanism A. The tension rollers 36 guide the release film 10 so as not to shift the release film 10 in the transverse direction while feeding. And the tension rollers 36 prevent the release film 10 from dipping downward while feeding.

Adjusting heads 40 guide the release film 10 to set the same at predetermined positions on the molding dies 12 and 14. The adjusting heads 40 are respectively provided to each side section of the molding dies 12 and 14. The adjusting heads 40 are arranged in the direction of the feeding direction of the release film 10 so as to hold the release film 10, which bridges over each molding die. The adjusting heads 40 are vertically moved to move the release film 10 close to and away from the parting faces of the molding dies 12 and 14.

In the present embodiment, the release film 10 is fixed on the parting face of each molding die 12 and 14 by air suction, this action will be explained.

Firstly, two sheets of the release film 10 are fixed on the parting faces of the molding dies 12 and 14, then air is sucked from sucking holes in bottom faces of the cavities, so the release film 10 is fixed on and along inner faces of the cavities. Next, the work pieces 20 and the resin are supplied. The work pieces 20 are clamped by the upper die 12 and the lower die 14 and molded with the melted resin. After the molding, the molding dies 12 and 14 are opened, then the molded products are peeled off from the release film 10 and taken out from the lower die 14.

Action of the feeding heads 26 and 27 while feeding the release film 10 will be explained.

In a state of mold opening, each release film 10 is sucked and fixed on the parting faces of the molding dies 12 and 14. Before each release film 10 is peeled off from the parting faces of the molding dies, firstly the feeding head 26 of the feeding section B is moved the prescribed distance, e.g., twice as long as the stroke of the adjusting heads 40, so as to dip the release film 10, so that the adjusting heads 40 are capable of moving with surplus. Next, the adjusting heads 40 are vertically moved to move the release film 10 away from the parting faces of the molding dies 12 and 14 and to hold the release film 10 in the states of slightly separating away therefrom.

After the adjusting heads 40 are moved, the feeding heads 26 and 27 are moved forward to feed the release film 10 the prescribed length. In principle, a stroke of the feeding head 26 of the feeding section B is equal to that of the feeding head 27 of the collecting section C. But if the releases film 10 is expanded or shrunk by molding heat and clamping force, the strokes of the feeding heads 26 and/or 27 should be corrected. Generally, the stroke of the feeding head 26 is fixed; the stroke of the feeding head 27 is corrected. Tension is applied to the release film 10 to horizontally contact the parting faces of the molding dies 12 and 14.

After the release film 10 is sent as described above, the new release film 10 is fixed on the parting faces of the molding dies 12 and 14, by the air suction, for the next molding. Namely, feeding the release film and molding the work pieces can be executed sequentially.

In FIG. 2, an anti-charging section 140 prevents the release film 10 from charging electricity. An ion-blow nozzle is extended from the anti-charging section 140 toward the release film 10. When the release film 10, which has been extended from the feeding reels 18, is electrically charged, static electricity is removed by ion-blowing. By removing the static electricity from the release film 10, the release film 10 can be smoothly fed. If the release film 10, which has been drawn from the feeding reels 18, is charged electrically, small dust particles, etc. are stuck thereon, and the dust particles maybe transcribed onto the molded products. The anti-charging section 140 can prevent these problems.

(THE CONVEYING MECHANISM)

In FIG. 1, a conveying head 50 feeds and sets the work pieces 20 in the molding die 14 and takes out the molded products from the molding die 14. The conveying head 50 comprises: a work feeding head for setting the work pieces 20 in the molding die 14; a resin feeding head for feeding the molding resin in the pot 22; and a product take-out head for taking out the products and disused resin after the molding.

The conveying head 50 is capable of reciprocatively moving between a shunting position, which is outside of the press mechanism A, and a position in the press mechanism A so as to set the work pieces 20 and take out the molded products. In FIG. 2, guide rails 51 guide the movement of the conveying head 50. The conveying head 50 is linearly and reciprocatively moved along the guide rails 51 so as to set the work pieces 20 and take out the molded products.

The work feeding head, the resin feeding head and the product take-out head are linearly arranged, in the moving direction of the conveying head 50, in the conveying head 50. The arrangement of the heads may be freely designed according to the order of their action, etc. In the case of setting the work pieces 20 while moving the conveying head 50 from a position outside of the press mechanism A to a position in the press mechanism A, for example, the product take-out head is provided to a front end of the conveying head 50, then the work feeding head and the resin feeding head are provided in order. In this case, firstly the molded products are picked up by the product take-out head when the conveying head 50 enters the press mechanism A, and the conveying head 50 further advances to set the work pieces 20 by the work feeding head, then the conveying head 50 further advances to supply the molding resin by the resin feeding head. Afterwards, the conveying head 50 is moved outside of the press mechanism A, and the molded products are accommodated in an accommodating tray, then the work feeding head holds and sets new work pieces, and a new resin is also fed to the resin feeding head.

The above described setting manner is applied to the case in which resin paths for filling the resin into the cavity spaces are formed in the upper die 12 (an upper-runner type die). In the case of using the wrapped resin, parts of the wrapping film partially cover the work pieces, so the arrangement of the runner paths in the molding die 12 is influenced by the positions of the wrapping film and the work pieces 20. In the case of setting the resin on the work pieces 20, the runner paths should be formed in the upper die 12; in the case of forming the runner paths in the lower die 14, the work pieces 20 should be set after the resin is set. In the case of setting the work pieces 20 after the resin is set, the work feeding head and the resin feeding head are reversely arranged in the feeding head 50.

Besides the above described setting manner, another manner may be employed, the manner comprises the steps of: entering the conveying head 50 into the press mechanism A; picking up the molded products by the product take-out head, which is arranged to the front end of the conveying head 50; taking out the products outside of the press mechanism A; transferring the products to an accommodating unit; simultaneously chucking the work pieces and the resin by the work feeding head and the resin feeding head; entering the conveying head 50 into the press mechanism A again; setting the work pieces 20 by the work feeding head; and setting the resin by the resin feeding head.

The method, in which the work pieces 20 and the resin are fed after the molded products are taken out, is capable of accommodating the molded products in a short time. So deformation of the products caused by unbalanced cooling, which is caused by a convection current of the melted resin, and inner stress will be limited to the minimum. Afterwards, the products are softly pinched by plates, which have been heated to the temperature of about 120° C., and gradually cooled until the temperature of about 50° C. Then the products are accommodated in a magazine, etc., so that good products, whose deformation and inner stress are quite small, can be produced.

Another method comprises the steps of: opening the molding dies; passing the conveying head 50 through the press mechanism A until reaching a forward end of the stroke; and picking up the products, setting the work pieces 20 and feeding the resin while the conveying head 50 moves backward. In this case, the steps of taking up the products and feeding the work pieces 20 are executed while the conveying head 50 moves toward a shunting position, so travelling distance of the products, which is being held by the conveying head 50, in the press mechanism A can be short, so that falling thin resin flash onto the molding die 14 can be prevented.

In FIG. 2, the arrangement of the product take-out head, the work feeding head and the resin feeding head in the conveying head 50 is changed. In the above described example, the resin is fed after the work pieces are set in the molding die, and vice versa. In the converse case, the work feeding head and the resin feeding head are arranged conversely.

In FIG. 2, the conveying head 50 is capable of entering the press mechanism A and taking out the molded products. The product take-out head 52 is provided to the forward end of the conveying head 50 then the resin feeding head 54 and the work feeding head 56 are provided in order.

At a shunting position, a product accommodating mechanism 60, a resin feeding mechanism 70 and a work feeding mechanism 80 are arranged according to the arrangement of the product take-out head 52, the resin feeding head 54 and the work feeding head 56 in the conveying head 50.

The product accommodating mechanism 60 has a degating section 62 and a product accommodating section 64. The degating section 62 receives the molded products from the product take-out head 52 of the conveying head 50 and removes disused resin from the products. The molded products from which the disused resin has been removed are accommodated in the product accommodating section 64. The disused resin which has been removed from the molded products is conveyed by a conveyor 66 and accommodated in an accommodating box 67.

The resin feeding mechanism 70 has a resin accommodating section 72, in which the resin is accommodated, and a transferring mechanism 74, which takes out the resin from the resin accommodating section 72 and transfers the resin to the resin feeding head 54.

The work feeding mechanism 80 has an accommodating section 82, in which the work pieces 20 are accommodated, and a transferring mechanism 84, which takes out the work pieces 20 from the accommodating section 82 and transfers the work pieces 20 to the work feeding head 56, which has been located at a shunting position. The transferring mechanism 84 holds the work pieces 20, whose interrelationship in the transferring mechanism 84 is the same as that in the molding die 14, and transfers them to the work feeding head 56 while keeping said interrelationship. The work feeding head 56 transfers the work pieces 20 to the molding die 14.

The conveying mechanism D reciprocatively moves the conveying head 50 and links the movement of the conveying head 50 with the molding action of the press mechanism A. And the conveying mechanism D is controlled to take out the molded products and to feed the resin. Simultaneously, the film feeding mechanism B and C links the film feeding action with the molding action of the press mechanism A.

(A FEEDING MECHANISM OF THE WRAPPED RESIN)

Figure 16:
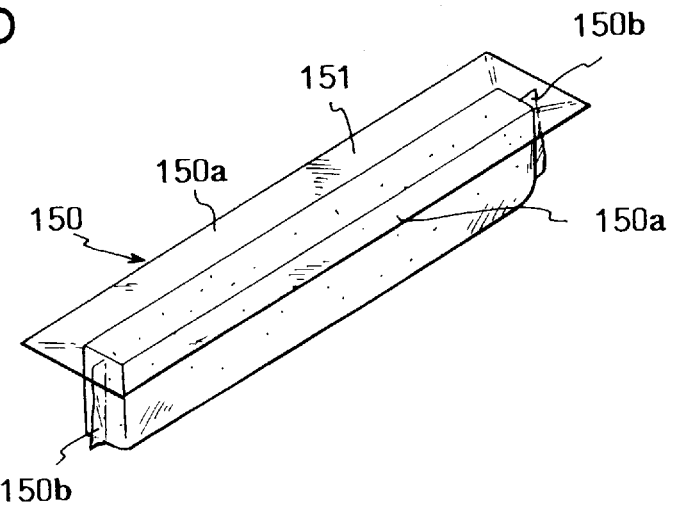
FIG. 16 is a perspective view of the wrapped resin.

In the present embodiment, the stick type resin 150 (see FIG. 16) is used as the molding resin. In the resin feeding section 70, the wrapped resin 150 is transferred to the resin feeding head 54 by the transferring mechanism 74. The feeding mechanism of the wrapped resin will be explained.

Figure 3:
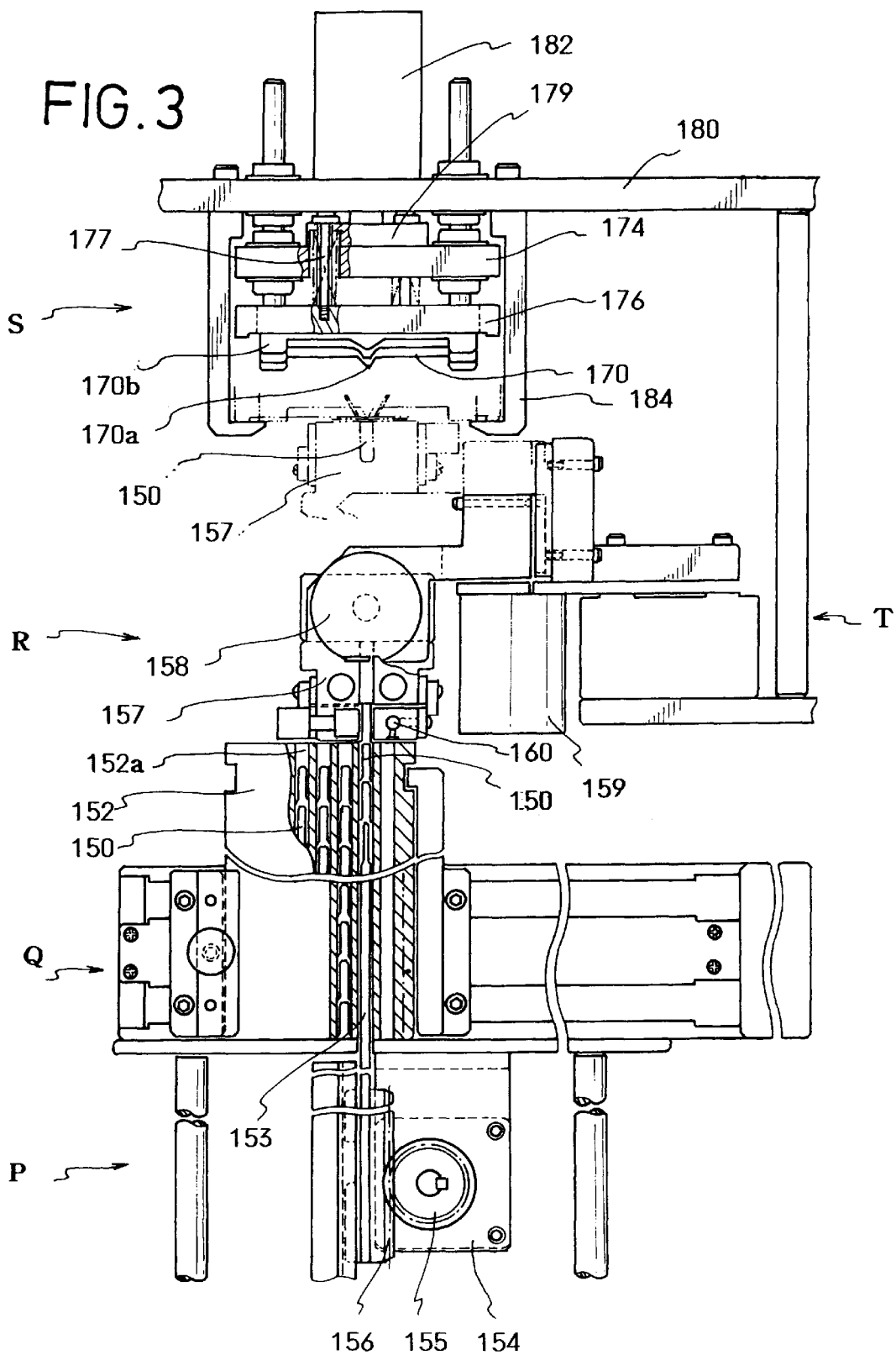
FIG. 3 is a side view of a resin feeding mechanism of the First Embodiment.
Figure 4:
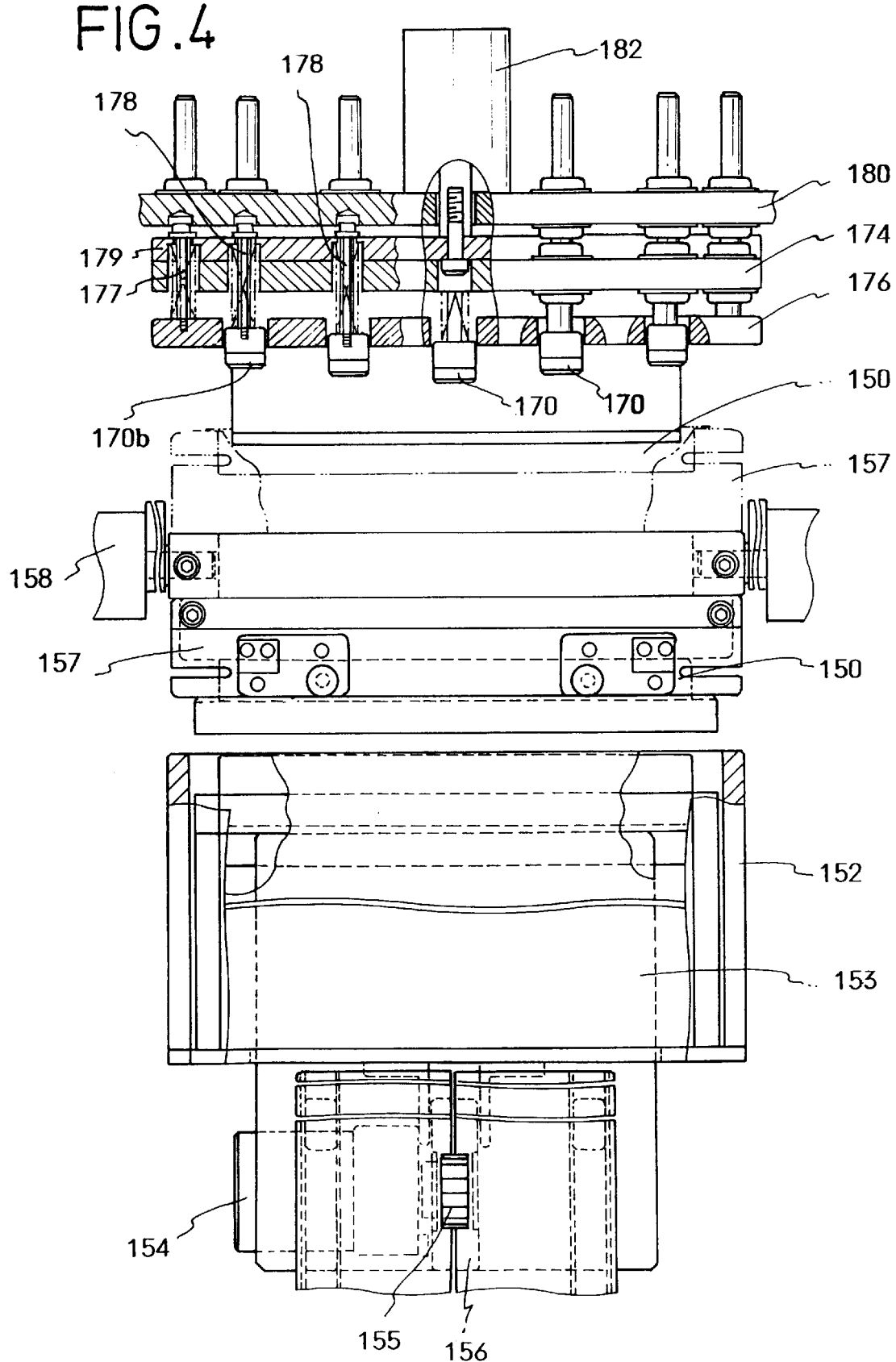
FIG. 4 is a front view of the resin feeding mechanism of the First Embodiment.

FIG. 3 is a side view of the feeding mechanism of the wrapped resin 150; FIG. 4 is a front view thereof. In the feeding mechanism, one piece of the wrapped resin 150 is taken out from a magazine, in which a plurality of pieces of the wrapped resin 150 have been accommodated, to transfer to the resin feeding head 54.

The feeding mechanism of the wrapped resin 150 has: a pusher section P for pushing the wrapped resin 150 in the magazine 152 upward; a setting section Q in which the magazine 152 is set; a turning chuck section R for chucking and turning the wrapped resin 150; a film forming section S for spreading the extended sections of the wrapping film flatwise; and a conveying section T for transferring the wrapped resin 150, whose extended sections of the wrapping film have been spread, to the conveying head 50.

The magazine 152 has a plurality of accommodating holes 152a in which a plurality of pieces of the wrapped resin are accommodated. The accommodating holes 152a are vertical through-holes. The wrapped resin is formed into an inverted U-shape in the accommodating holes 152. In the accommodating holes 152, the extended sections 150a of each wrapped resin 150 are bent downward to form into the inverted U-shape, and another wrapped resin 150 is provided in the inverted U-shaped space, so that a plurality of pieces of the wrapped resin 150 are piled in the accommodating holes 152.

Since the extended sections 150a of each wrapped resin 150 are bent downward, the wrapped resin 150 can be smoothly pushed upward by a pusher 153.

In the pusher section P, the pusher 153 is inserted into the magazine 152 from its bottom. The pusher 153 pushes the wrapped resin 150 upward one by one to transfer the resin 150 to the turning chuck section R. The pusher 153 is vertically moved by a motor 154, a pinion 155 and a rack 156. As shown in FIG. 4, the pusher 153 is a wide plate, which can be inserted into the magazine 152.

After all wrapped resin 150 in one accommodating hole 152a are transferred, the pusher 153 is pulled outside from the bottom, then the pusher 153 is moved sideward to correspond to the adjacent accommodating hole 152a, so that the wrapped resin 150 in the adjacent accommodating hole 152a can be transferred to the turning chuck section R.

The turning chuck section R comprises: a turning block 157, which is capable of receiving the wrapped resin 150 which has been pushed upward from the magazine 152; a motor 158 for turning the turning block 157; and a vertical cylinder 159, which is capable of moving the turning block 157 between a position, at which the turning block 157 receives the the wrapped resin 150, and a position, at which the turning block 157 is turned.

A base section of the turning block 157 is connected with a motor shaft of the motor 158, so that the turning block 157 is capable of turning or rotating in a 180-degree arc. The turning block 157 has: a holding mechanism for accommodating and holding the wrapped resin 150; and sucking holes 160, which are bored in end faces of the turning block 157 and which are capable of sucking the extended sections 150a of the wrapped resin 150. The sucking holes 160 are communicated with an external air sucking mechanism for air suction.

When a sensor (not shown) detects that the turning block 157 holds the wrapped resin 150, a pushing action of the pusher 153 is stopped. Then the vertical cylinder 159 lifts the turning block 157 and the motor 158 until reaching the turning position at which the turning block 157 is turned. The turning block 157 is headed downward until reaching the turning position, then the tuning block 157 is turned 180 degrees by the motor 158.

By turning the turning block 157, the wrapped resin 150 is moved to a top position and held there. In FIG. 3, the wrapped resin 150 which is held at the top position is shown by two-dot chain lines. In this state, the extended sections 150a are extended upward, so the wrapped resin 150 is formed into a U-shape.

The film forming section S forms the wrapping film 151 of the wrapped resin 150 flatwise with the turning chuck section R. As shown in FIGS. 3 and 4, the film forming section S has a plurality of pressing blocks 170. The pressing blocks 170 press the extended sections 150a flatwise with the turning block 157. The pressing blocks 170 are capable of pressing the wrapping film 151 by their own elasticity.

A first movable plate 174 and a second movable plate 176 are attached to a frame 180. The first movable plate 174 and the second movable plate 176 are capable of vertically moving with respect to the frame 180. The first movable plate 174 is connected to a rod of an air cylinder 182, so the first movable plate 174 is vertically moved by the air cylinder 182. The second movable plate 176 is connected to the first movable plate 174 by suspending bolts 177. Springs respectively cover the suspending bolts 177, and the springs are elastically provided between the first movable plate 174 and the second movable plate 176.

As shown in FIG. 4, the pressing blocks 170 are connected to the first movable plate 174 by suspending bolts 178. Springs respectively cover the suspending bolts 178, and the springs are elastically provided between the first movable plate 174 and the pressing blocks 170. The pressing block 170 which is located at the center of a line of the pressing blocks 170 is most projected downward; the pressing blocks 170 which are less projected toward both ends of the line of the pressing blocks 170. With this structure, firstly center parts of the extended section 150a of the wrapping film 151 is pressed, then the extended section 150a is gradually pressed toward its edges. Note that, the suspending bolts 177 and 178 are pierced through a holding plate 179 and held thereby.

The film forming section S spreads the wrapping film 151 by the steps of: holding the wrapped resin 150 by the turning block 157; moving the first movable plate downward by the air cylinder 182; and pressing the wrapping film 151 by the pressing blocks 170. When the first movable plate 174 is gradually moved downward, the wrapping film 151 is gradually spread from the center part toward its edges. The pressing blocks 170 are relatively moved upward with respect to the second movable plate 176. Finally, a bottom face of the second movable plate 176 contacts the wrapping film 151, and the extended sections 150a of the wrapping film 151 are spread flatwise.

As shown in FIG. 3, there is provided a projection 170a for pressing the wrapping film 151 at a center of each pressing block 170. The angle of the projection 170a of the central pressing block 170 is made acute; the angles of the projections 170a of the other pressing blocks 170 are made obtuse toward the end pressing blocks 170. With this structure, the wrapping film 151 can be spread easily.

As shown in FIG. 3, there is provided stoppers 170b at both ends of each pressing block 170. When the pressing blocks 170 are moved downward, the stoppers 170b contact fixed arms 184 so as to prevent the pressing blocks 170 from damaging the wrapping film 151 of the wrapped resin 150.

When the wrapping film 151 is spread by the pressing blocks 170 and the second movable plate 176, the spread wrapping film 151 is fixed on an upper face of the turning block 157 by air suction through the sucking holes 160. By the air suction, the wrapping film 151 is spread flatwise and fixed on the upper face of the tuning block 157.

The wrapped resin 150 which has been held by the turning block 157 is moved sideward, by the conveying section T, until reaching a position under the feeding head 50. Then the wrapped resin 150 is transferred to the feeding head 50. In the present embodiment, the feeding head 50 sucks upper faces of the extended sections 150a of the wrapping film 151, so that the wrapped resin 150 can be transferred from the turning block 157 to the feeding head 50.

Note that, in the present embodiment, the wrapping film 151 is bent to form the wrapped resin 150 into the inverted U-shape in the magazine 152. The wrapped resin 150 may be formed into a U-shape in the magazine 152. In this case, the wrapped resin 150 is pushed downward to take out from the magazine, and the film forming section S may spread the wrapping film 151 flat wise. In the method of pushing the wrapped resin 150, which has been into the U-shape in the magazine 152, downward, no turning chuck section R is required.

Further, the wrapped resin 150 may feed by the steps of: setting the magazine 152, in which a plurality of pieces of the wrapped resin 150 are piled and accommodated, at a feeding position; removing the magazine only at the feeding position and leaving the piled wrapped resin 150 thereat; and feeding the wrapped resin 150 in order.

(A MECHANISM FOR SETTING THE WRAPPED RESIN IN THE DIE)

A mechanism for setting the wrapped resin 150 in the die 14 is capable of transferring the wrapped resin 150, which has been transferred to the resin feeding head 54 of the conveying head 50, correctly feeding into the pot 22 of the lower die 14.

Figure 5:
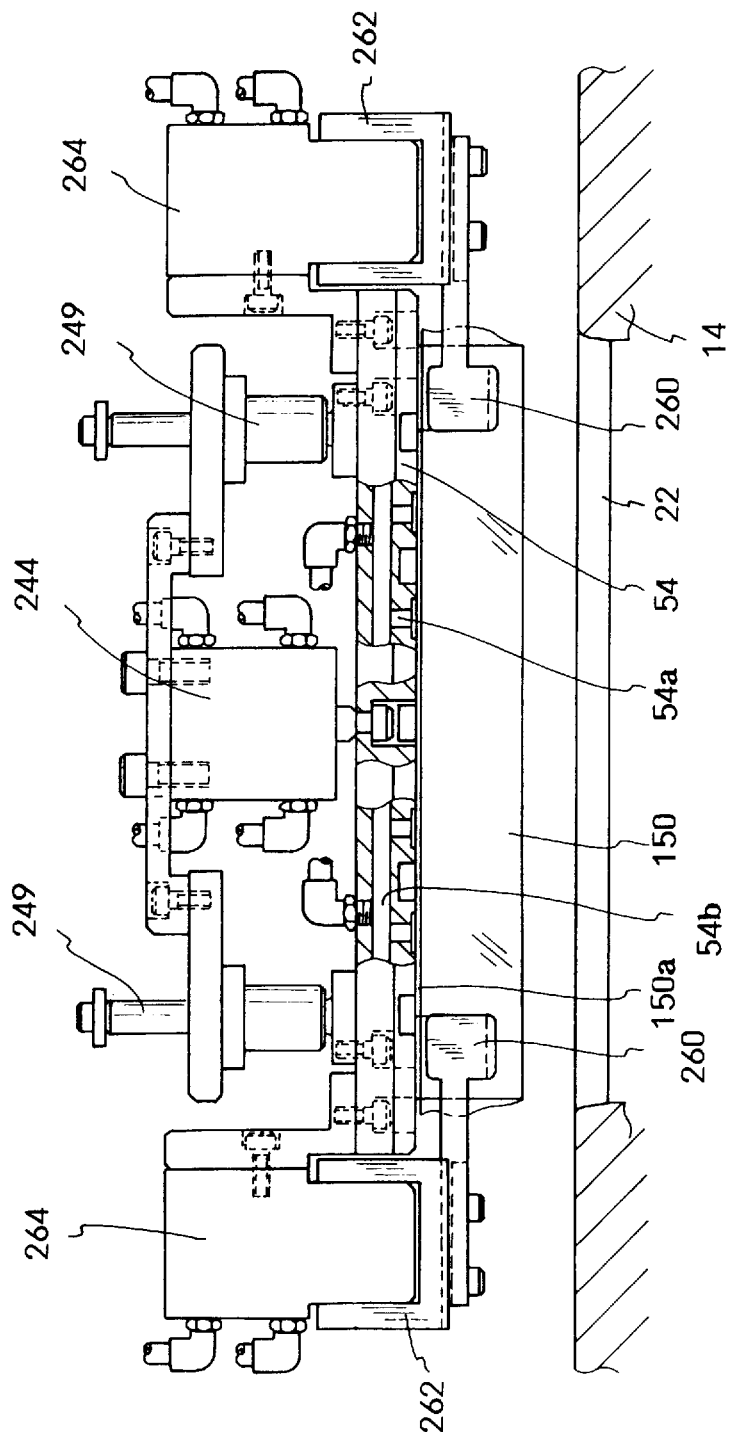
FIG. 5 is a front view of a mechanism for setting wrapped resin in the molding die.
Figure 6:
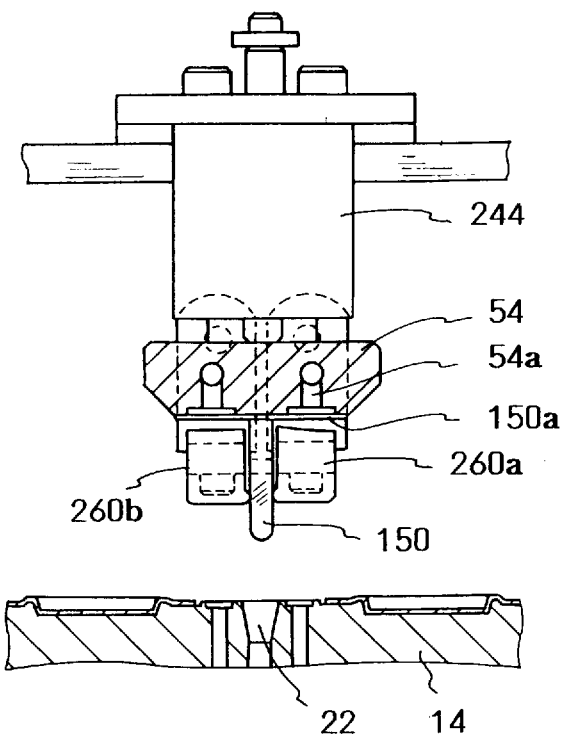
FIG. 6 is a side view of the mechanism for setting the wrapped resin in the molding die.

FIG. 5 is a front view showing a state in which the conveying head 50, whose resin feeding head 54 is holding the wrapped resin 150, locates at a position above the lower die 14; FIG. 6 is a side view showing the same state. The resin feeding head 54 holds the wrapped resin 150 by air suction. Thus, the resin feeding head 54 has a plurality of air sucking holes 54a to suck the extended sections 150a of the wrapped resin 150. The air sucking holes 54a are communicated with an external air sucking unit via air paths 54b in the resin feeding head 54. An air cylinder 244 vertically moves the resin feeding head 54. The vertical movement of the resin feeding head 54 is guided by guide rods 249.

In the present embodiment, holding means is provided to correctly supply the wrapped resin 150 into the pot 22 by the resin feeding head 54. The means for holding the wrapped resin 150 comprises: pinching blocks 260 capable of pinching both sides of a resin section of the wrapped resin 150; rotary arms 262 for respectively holding the pinching blocks 260; and air cylinders 264 for respectively rotating the pinching blocks 260 between a pinching position and a release position.

FIGS. 5 and 6 show a state in which the extended sections 150a of the wrapped resin 150 are held by the resin feeding head 54, and the resin section of the wrapped resin 150 are pinched, at longitudinal ends, by the pinching blocks 260a and 260b. By holding the resin section of the wrapped resin 150, the wrapped resin 150 can be correctly supplied into the pot 22. If the extended sections 150a of the wrapping film 151 are held to supply the wrapped resin 150 into the pot 22, it is very difficult to correctly supply the wrapped resin 150 into the pot 22.

Action of the mechanism for setting the wrapped resin 150 will be explained with reference to FIGS. 7–9.

When the wrapped resin 150 is supplied from the resin feeding head 54 to the pot 22, firstly the wrapped resin 150 is held by the pinching blocks 260a and 260b, then a lower end section of the wrapped resin 150 is slightly inserted into the pot 22 and stopped once (see FIG. 7) so as to correctly set the wrapped resin 150 into the pot 22. In the wrapped resin 150, the resin section is tightly wrapped with upper wrapping film and lower wrapping film, and the wrapped resin 150 has sealed parts 150b on the both sides of the resin section (see FIG. 16). By holding the wrapped resin 150 with the pinching blocks 260a and 260b, the wrapped resin 150 can be correctly set into the pot 22 even if the sealed parts 150b are formed. Note that, an upper end of the pot 22 is opened, so an inner face of the pot 22 may be formed into a female tapered face to easily introduce the wrapped resin 150 into the pot 22.

Next, an air cylinder 264 is driven to turn the pinching blocks 260a and 260b from lower positions to horizontal positions (see FIG. 8), then the pinching blocks 260a and 260b release the wrapped resin 150.

Next, the resin feeding head 54 is pushed downward again by an air cylinder 244 to set the wrapped resin 150 into the pot 22. Even if the pinching blocks 260a and 260b release the wrapped resin 150, the wrapped resin 150 is held by the resin feeding head 54, and the lower end section of the wrapped resin 150 has been inserted in the pot 22, so the wrapped resin 150 can be set into the pot 22 (see FIG. 9).

Figure 8:
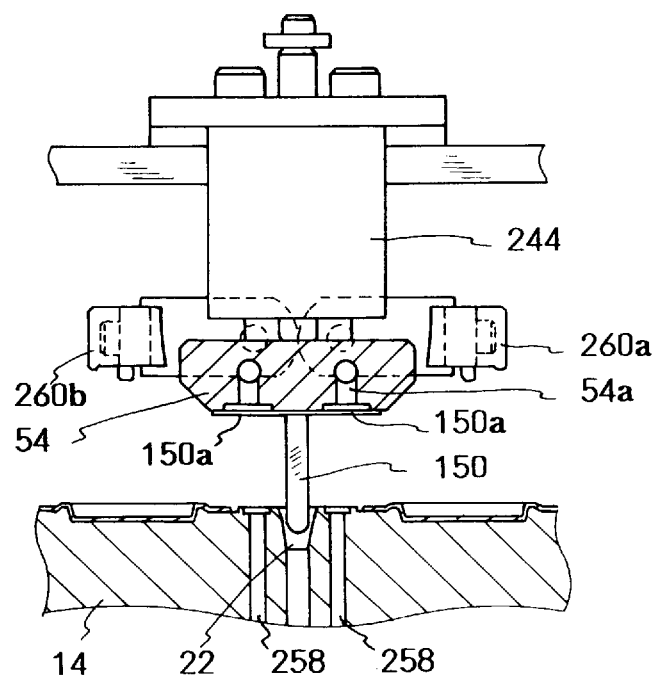
FIG. 8 is a side view of the state of setting the wrapped resin in the pot.

To set the wrapped resin 150, which has been inserted in the pot 22, in the molding die 14, the extended sections 150a of the wrapped resin 150 are sucked through air sucking holes 258 of the molding die 14 (see FIG. 8).

After the wrapped resin 150 is set in the pot 22, the resin feeding head 54 is moved upward, then the conveying head 50 can be moved for the next step.

In the mechanism for setting the wrapped resin 150, the lower section of the wrapped resin 150 is inserted into the pot 22, and the insertion is once stopped. Then the pinching blocks 260 release the wrapped resin 150 to completely set the wrapped resin 150 in the pot 22. This method is effective for correctly setting the wrapped resin 150 into the pot 22. The sealed parts 150b are formed into many shapes, and the sealed parts 150b are bent and pushed onto the inner face of the pot 22, so the wrapped resin 150 must be set in the pot 22 correctly like the present embodiment. In the case of using a large wrapped resin 150 which has large amount of resin, the wrapped resin 150 is apt to shift from the correct position, so the method of setting the wrapped resin 150 of the present embodiment will be effective.

Second Embodiment

Figure 10:
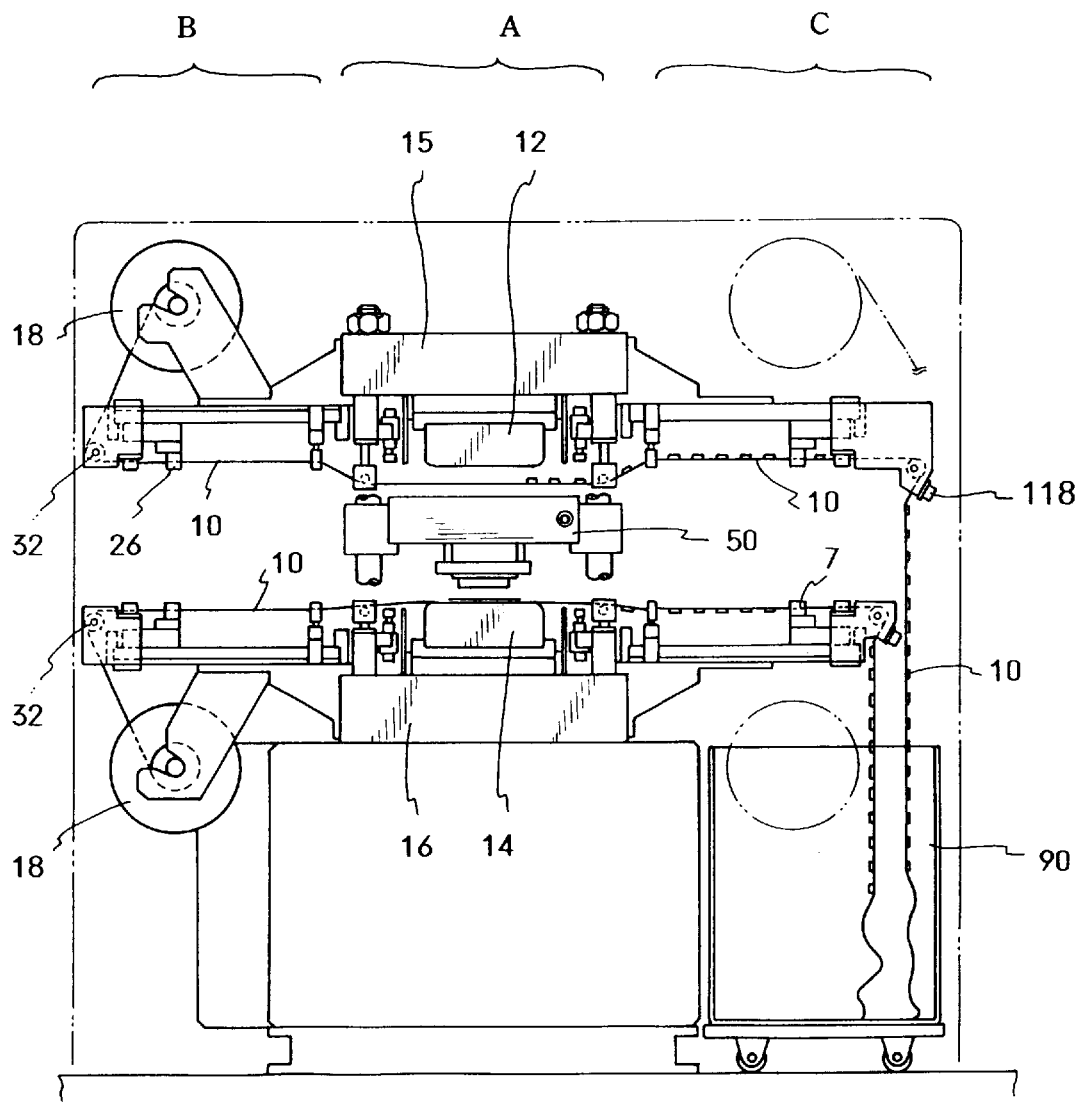
FIG. 10 is a front view of the automatic molding machine of the Second Embodiment.

FIG. 10 is a front view of the automatic molding machine of the Second Embodiment. The automatic molding machine has: the press mechanism A; the film feeding mechanism B, C; and the product take-out mechanism as well as the First Embodiment. Their arrangement is the same as that of the First Embodiment. The action of the press mechanism, the film feeding mechanism and the product take-out mechanism are equal to those of the First Embodiment.

In the present embodiment, the feeding reels 18 are respectively provided to the fixed platen 15 and the movable platen 16. Each release film 10 is fed from the feeding reels 18 toward the press mechanism A via the rollers 32 as well as the First Embodiment. The release film 10 is sent by the feeding heads 26 and 27.

In the present embodiment, the used release film 10 is hung down and introduced into an accommodating box 90, which is provided under the machine to collect the used release film 10 therein. To prevent the used release film 10 discharged from the upper die 12 from interfering with the used release film 10 discharged from the lower die 14, they are hung down at different positions.

Third Embodiment

Figure 11:
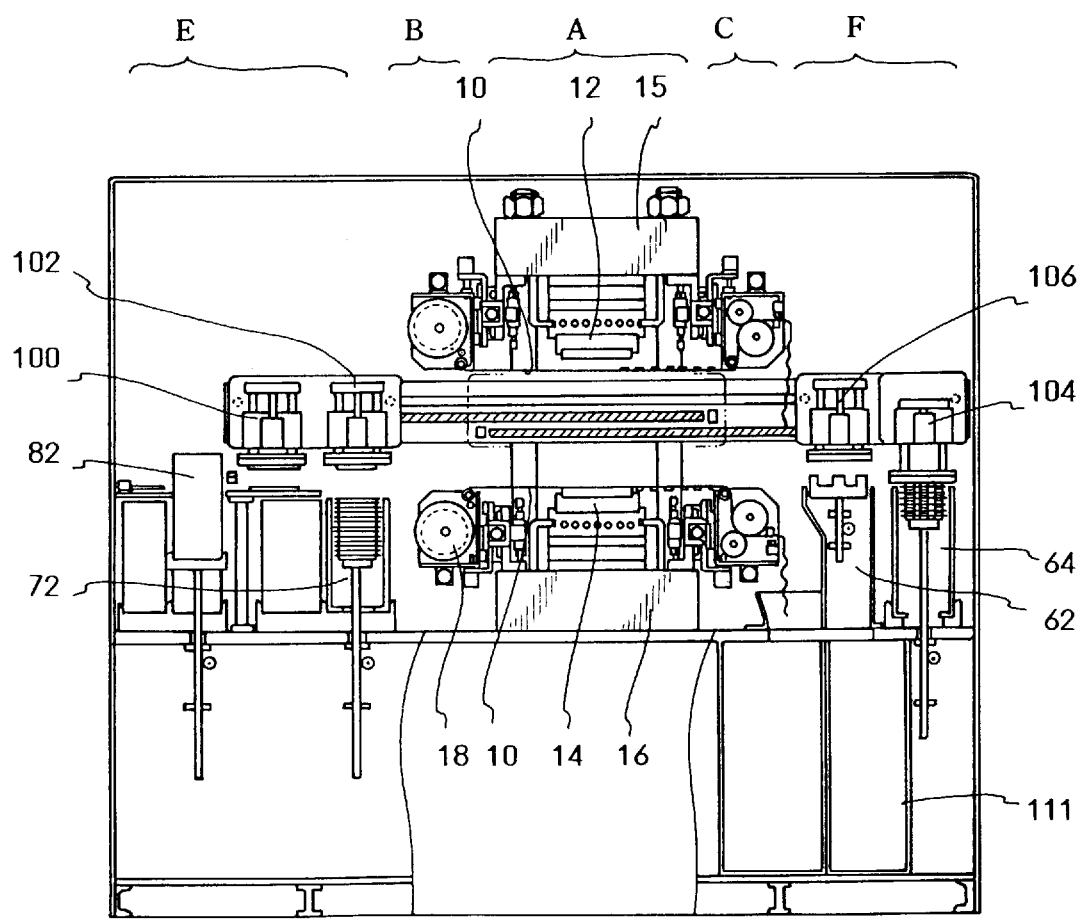
FIG. 11 is a front view of the automatic molding machine of the Third Embodiment.
Figure 12:
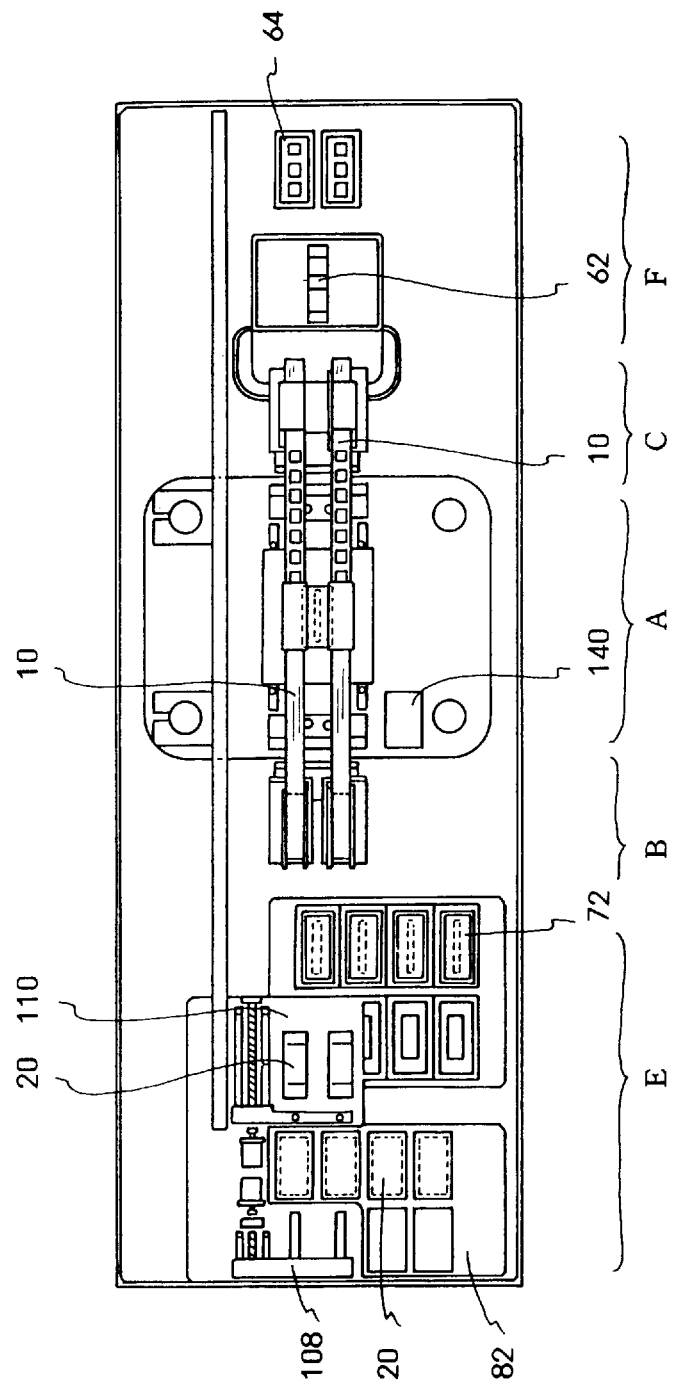
FIG. 12 is a plan view of the automatic molding machine of the Third Embodiment.

FIG. 11 is a front view of the automatic molding machine using the release film of the Third Embodiment; FIG. 12 is a plan view thereof. In the present embodiment, the conveying head is moved parallel to the feeding direction of the release film 10 to feed the work pieces 20 and to take out the molded products. The film feeding section B and the film collecting section C are respectively provided on both sides of the press mechanism A. A work feeding section E is located out side of the feeding section B; a product take-out section F is located out side of the collecting section C.

The work feeding section E has a work feeding head 100 for transferring the work pieces 20 onto the molding die 14 and a resin feeding head 102 for feeding the resin into the pot of the die 14. The product take-out section F has a product take-out head 104 for taking out the molded products from the molding die 14 and a resin take-out head 106 for taking out the disused resin from the molding die 14 after the molding.

Height of the work feeding head 100, the resin feeding head 102, the product take-out head 104 and the resin take-out head 106 are designed to enter the press mechanism A when the molding dies 12 and 14 are opened. And they are held by a guide mechanism, so they can be moved horizontally. In the present embodiment, the heads are driven by ball bearing screws, but driving means is not limited to them.

(THE CONVEYING MECHANISM)

The work feeding head 100 chucks the work pieces 20, e.g., lead frames, and transfers them onto the lower die 14. Thus, as shown in FIG. 11, the accommodating section 82, in which the work pieces 20 are accommodated, is provided under a shunting position of the work feeding head 100. The work pieces 20 are transferred from the accommodating section 82 to the work feeding head 100. The molding dies 12 and 14 are capable of molding two work pieces 20 in one molding cycle, so the work feeding head 100 is capable of chucking and transferring two work pieces 20 at one time.

In FIG. 12, a pusher 108 pushes out two work pieces 20 from the accommodating section 82, in which the work pieces 20 are accommodated, onto a table 110. The work feeding head 100 is located at the shunting position or the position above the table 110, then the work feeding head 100 chucks and conveys two work pieces 20, which have been located on the table 110, to the setting positions on the molding die 14. The work pieces 20 were arranged on the table 110 with interrelationship of the setting positions, so the work pieces 20 can be set in the setting positions in the lower die 14 by moving the resin feeding head 100 parallel.

An accommodating section 72 accommodates the resin for molding the work pieces 20. When the resin feeding head 102 locates at a shunting position, the resin feeding head 102 locates above the accommodating section 72. In the present embodiment, a plurality of pieces of the stick resin are vertically piled in the accommodating section 72, and they are pushed upward one by one, and the resin pushed is chucked by the resin feeding head 102. The resin feeding head 102 is horizontally moved to a position above the pot of the molding die 14, and it sets the resin into the pot.

The product take-out head 104 proceeds to a position above the molding die 14 after the molding dies 12 and 14 are opened, then it takes out the molded products from the lower die 14. After taking out the products, the product take-out head 104 moves to a shunting position and accommodates the products into the accommodating section 64, which is located under the shunting position. On the way to the shunting position, the product take-out head 104 once stops at the degating section 62 to remove disused resin from the products before accommodating into the accommodating 64. The disused resin, which has been removed by the degating section 62, falls into a box 111. The molded products are piled in order in the accommodating section 64.

The resin take-out head 106 takes out disused resin from the molding dies. In the case that the disused resin is independently taken out form the pot, etc. when the molded products are taken out from the molding die. The disused resin is taken out by the resin take-out head 106, and the product take-out head 104 takes out the molded products. In this case, the degating step can be omitted, and the resin take-out head 106 is moved to the degating section 62 to fall the disused resin into the box 111.

(THE FILM FEEDING MECHANISM)

The film feeding mechanism intermittently feeds the release film 10 to the prescribed length so as to pass through the press mechanism A and to cover the upper die 12 and the lower die 14 as well as the First Embodiment and the Second Embodiment.

Figure 13:
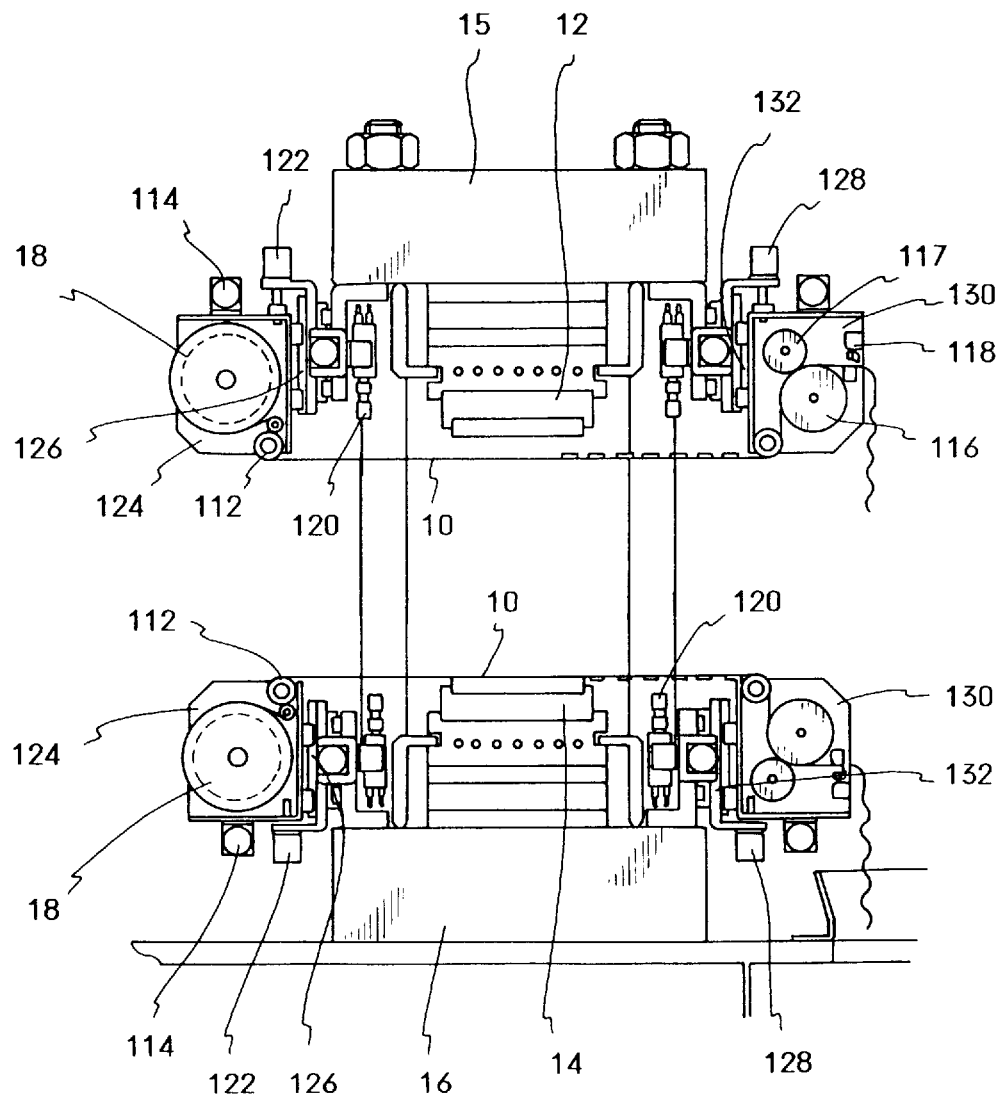
FIG. 13 is a front view of a film feeding mechanism of the Third Embodiment.

FIG. 13 is an enlarged view of the film feeding mechanism. The feeding reels 18, around each of which the release film 10 is wound, are provided to the upper die 12 and the lower die 14.

The release film 10 is intermittently fed the prescribed length by pinch rollers 112. By employing the pinch rollers 112, the structure of the machine can be simpler. But the release film 10 sometimes slips between the rollers 112, so film feeding accuracy of the present embodiment maybe lower than that of the automatic molding machine employing the feeding heads 26 and 27. The pinch rollers 112 are rotated by motors 114.

To collect the used release film 10, the release film 10 is pinched and discharged by press rollers 116 and 117. The press rollers 116 and 117 are driven by the motors 114 with timing belts. The used release film 10 passing through the press rollers 116 and 117 is hung down and accommodated in the accommodating box 111. To prevent the release film 10 from interferring with the feeding heads, which enters the press mechanism A, the release film is cut, with prescribed length, by a cutter 118. For the lower die 14, the release film 10 hung down causes no problems, but it is also cut to accommodate easily by the cutter 118.

If images for transcription is printed on the release film 10, the images can be transcribed onto the molded products from the release film 10. And, if heat sinks made of copper or aluminum are stuck on the release film 10, the heat sinks can be transferred to and molded in the products. In these cases, the release film 10 must be fed precisely. To feed the release film 10 with higher accuracy, the feeding length must be corrected according to deformation of the release film 10, which is caused by molding heat and clamping force.

In the present embodiment, sensors 120 for detecting the feeding length of the release film 10 are provided on the film feeding side and the film collecting side. The feeding length of the release film 10 can be corrected on the basis of the actual feeding data of the release film 10, which is detected by the sensors 120. The sensor 120 on the film feeding side detects a feeding error of the pinch rollers 112; the sensor 120 on the film collecting side detects degree of deformation of the release film 10 caused by molding heat.

Sometimes the release film 10 is shifted in the transverse direction when the release film 10 is fed. The sensors 120 are capable of detecting said shift. If the release film 10 is shifted in the transverse direction, the film feeding mechanism for feeding the release film 10 may be moved in said direction by, e.g., a motor-screw mechanism for correcting said shift. CCD cameras, for example, may be employed as the sensors 120.

In the present embodiment, the film feeding mechanism including the feeding reels 18 and the press rollers 116 and 117, which are provided on the side of the press mechanism A and support the release film 10, is moved in the vertical direction to relatively move the release film 10 close to and separate away from the parting faces of the molding dies 12 and 14.

In FIG. 13, holding frames 123 hold the feeding reels 18. The holding frames 124 are guided by slide guides 126 and vertically moved by motors 122. Holding frames 130 hold the press rollers 116 and 117, etc. on the film collecting side. Motors 128 vertically move the holding frames 130. The holding frames 130 are also guided in the vertical direction by slide guides 132.

To feed the release film 10 to the molding dies 12 and 14, the release film 10 is separated away from the parting faces of the molding dies 12 and 14 and sent to the prescribed length, then the feeding action is once stopped. Next, the release film 10 is moved onto the parting faces of the molding dies 12 and 14 by driving the motors 122 and 128. Then the release film 10 is fixed thereon by the air suction.

After completing the molding step, the molding dies 12 and 14 are opened. The molded products in the lower die 14 are taken out therefrom, then the release film 10 is separated away from the parting face of each molding die 12 and 14 by driving the motors 122 and 128.

The action of the word feeding head 100, the resin feeding head 102, the product take-out head 104 and the resin take-out head 106 are linked with feeding the release film 10. Namely, the molded products are taken out and the new release film 10 is fed after opening the molding dies 12 and 14, then the new work pieces 20 and the new resin are set. Order of setting the resin and the work pieces 20 may be freely designed.

Fourth Embodiment

Figure 14:
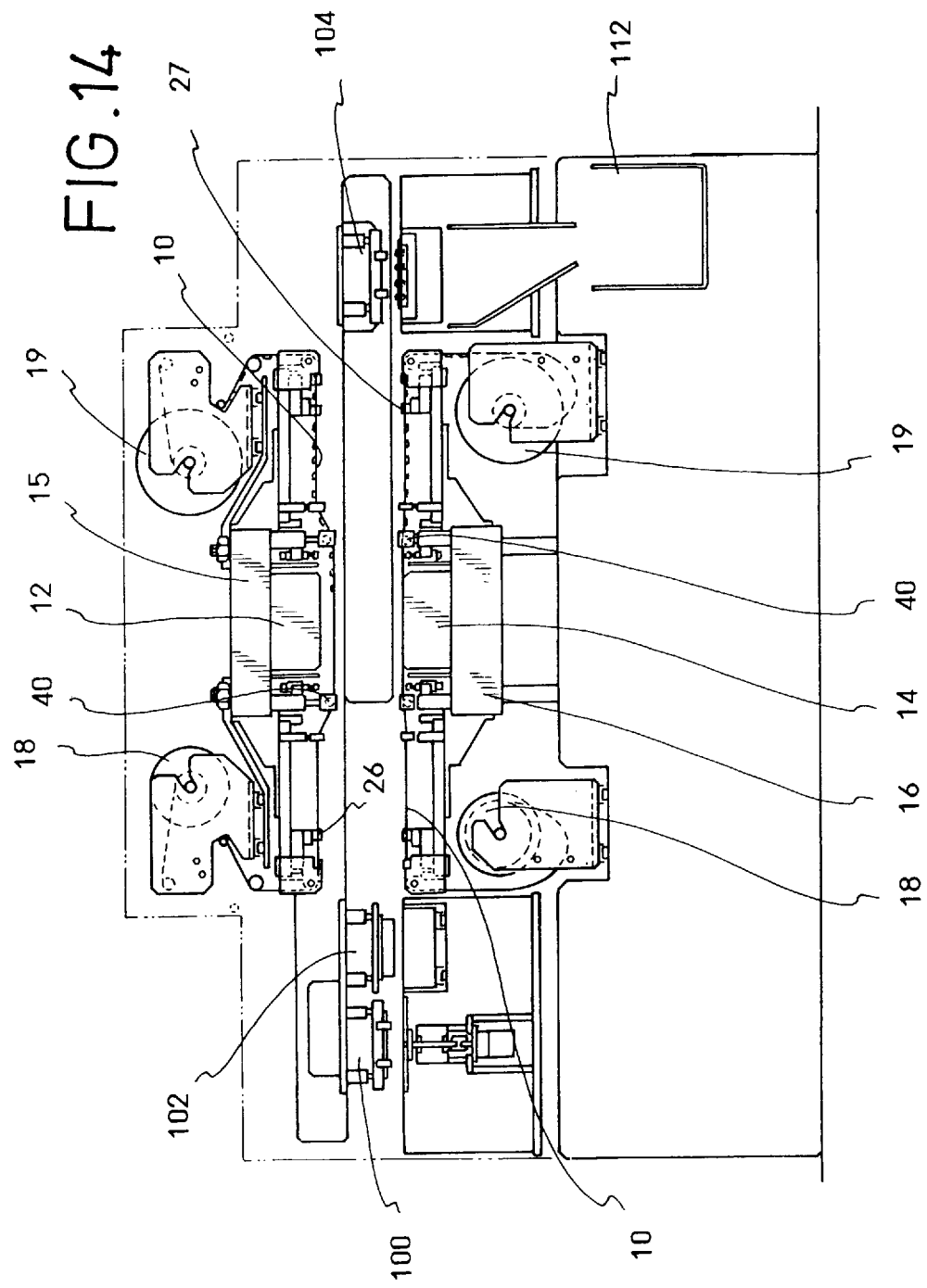
FIG. 14 is a plan view of the automatic molding machine of the Fourth Embodiment.
Figure 15:
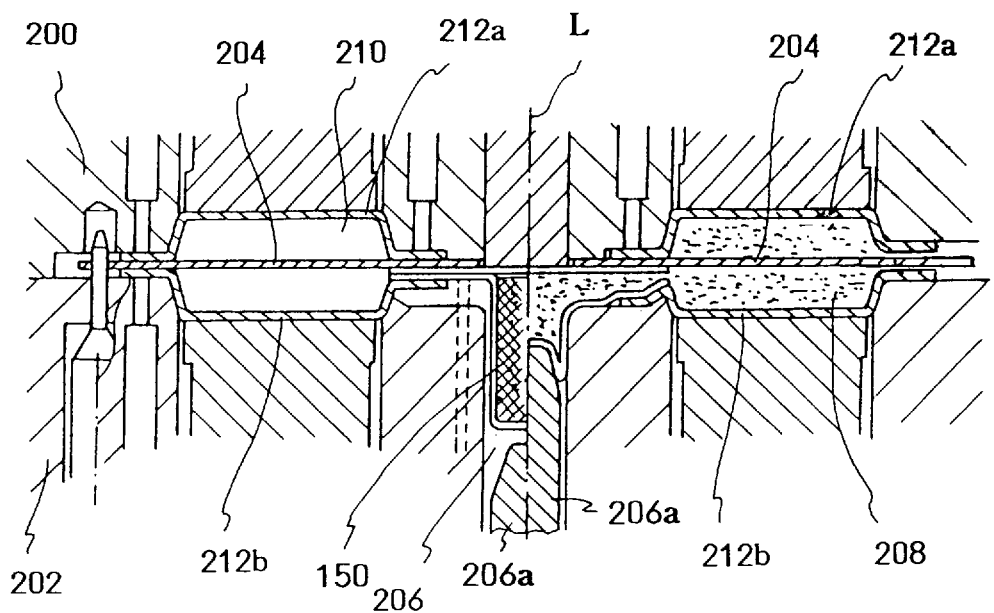
FIG. 15 is an explanation view showing the molding method using the release film.

FIG. 14 is a front view of the automatic molding machine of the Fourth Embodiment. In the Fourth Embodiment, the conveying head is moved parallel to the film feeding direction to feed the work pieces and take out the molded products as well as the Third Embodiment.

Note that, in the Fourth Embodiment, the release film 10 is fed by the feeding heads 26 and 27, which are capable of moving parallel to the feeding direction of the release film 10. As well as the First Embodiment and the Second Embodiment, the reels 18 for feeding the release film 10 and the reels 19 for collecting the release film 10 are provided on each side of the press mechanism. The release film 10 is fed by the feeding heads 26 and 27, which is capable of reciprocatively moving in the film feeding direction. And the release film 10 is moved close to and separated away from the parting faces of the molding dies by the adjusting heads 40.

As well as the Third Embodiment, the work feeding head 100 of the work feeding mechanism, the resin feeding head 102 of the resin feeding mechanism, and the product take-out head 104 of the product take-out mechanism are provided outside of the mechanism for feeding the release film 10.

Note that, in the present embodiment, the product take-out head 104 only provided on a product take-out side, and no resin take-out head is provided thereon. But the resin take-out head may be provided if it is necessary to take out the disused resin from the molding dies.

In the Third Embodiment and the Fourth Embodiment, the conveying mechanism and the press mechanism are linearly arranged. With this arrangement, an operator can works on one side of the machine, so the operator can operate the machine easily. Further, a required area of the molding machine can be reduced.

In the above described embodiments, the work pieces 20 are formed into the short strip shapes, e.g., the lead frames. But a long belt member, to which a plurality of work pieces are seriesly attached, can be fed if the feeding direction of the work pieces is the same as that of the feeding the release film 10 as well as the Third Embodiment and the Fourth Embodiment.

In the above described embodiment, the release film 10 is fed for each work piece 20, but a sheet of wide release film, which is capable of covering over the pot and the cavities, can be used. In this case, the wrapped resin or the ordinal resin which is not wrapped with the wrapping film can be used as the resin for molding.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An automatic molding machine, comprising:

first and second molding dies for cooperating with each other;

a press mechanism, said molding dies being attached to said press mechanism, said press mechanism clamping and molding a work piece set in said molding dies in a longitudinal direction;

a plurality of molding sections formed in each of the molding dies, said plurality of molding sections arranged linearly with respect to the longitudinal direction of the work piece, the molding sections of the first molding die cooperating with the molding sections of the second molding die;

a film feeding mechanism for linking with molding action of said press mechanism, said film feeding mechanism for feeding release film, formed into a long belt form, to a prescribed length so as to correspond to a setting position of said work piece set in said molding dies, the release film being fed in the longitudinal direction of the work piece; and a conveying mechanism for linking with the molding action of said press mechanism, said conveying mechanism feeding said work piece and resin into said molding die and taking out a molded product therefrom, said conveying mechanism further comprising:

a work feeding head mounted for moving in a direction generally perpendicular to the feeding direction of the release film;

a resin feeding head for feeding the resin into a pot of said molding die; and a product take-out head for taking out said molded product from said molding die, said automatic molding machine further comprising a resin feeding mechanism for automatically feeding the resin to said resin feeding head, said resin feeding mechanism comprising:

a setting section in which wrapped resin, resin wrapped with wrapping film, is set;

a film forming mechanism for forming an extended section of the wrapping film of the wrapped resin, which has been set in said setting section, flatwise; and a feeding mechanism for feeding the wrapped resin, whose extended section of the wrapping film has been formed flatwise, to a transferring position at which the wrapped resin is transferred to said resin feeding head, wherein said work piece is molded by said molding dies whose molding sections are covered with the release film, a plurality of linearly arranged resin molded sections being formed in the work piece from the resin entering the plurality of molding sections formed in the molding dies.

2. An automatic molding machine, comprising:

first and second molding dies for cooperating with each other;

a press mechanism, said molding dies being attached to said press mechanism, said press mechanism clamping and molding a work piece set in said molding dies in a longitudinal direction;

a plurality of molding sections formed in each of the molding dies, said plurality of molding sections arranged linearly with respect to the longitudinal direction of the work piece, the molding sections of the first molding die cooperating with the molding sections of the second molding die;

a film feeding mechanism for linking with molding action of said press mechanism, said film feeding mechanism for feeding release film, formed into a long belt form, to a prescribed length so as to correspond to a setting position of said work piece set in said molding dies, the release film being fed in the longitudinal direction of the work piece; and a conveying mechanism for linking with the molding action of said press mechanism, said conveying mechanism feeding said work piece and resin for molding into said molding die and taking out a molded product therefrom, said conveying mechanism further comprising:

a work feeding head mounted for moving in a direction generally parallel to the feeding direction of the release film;

a resin feeding head for feeding the resin into a pot of said molding die; and a product take-out head for taking out said molded product from said molding die, said automatic molding machine further comprising a resin feeding mechanism for automatically feeding the resin to said resin feeding head, said resin feeding mechanism comprising:

a setting section in which wrapped resin, resin wrapped with wrapping film, is set;

a film forming mechanism for forming an extended section of the wrapping film of the wrapped resin, which has been set in said setting section, flatwise; and a feeding mechanism for feeding the wrapped resin, whose extended section of the wrapping film has been formed flatwise, to a transferring position at which the wrapped resin is transferred to said resin feeding head, wherein said work piece is molded by said molding dies whose molding sections are covered with the release film, a plurality of linearly arranged resin molded sections being formed in the work piece from the resin entering the plurality of molding sections formed in the molding dies.

3. The automatic molding machine according to claim 1 or 2,
wherein said resin feeding mechanism further includes:
a magazine in which a plurality of pieces of the wrapped resin, which are bent to form U-shapes, are piled and accommodated; and
a pushing mechanism for pushing out the wrapped resin from said magazine.

4. The automatic molding machine according to claim 3,
wherein said pushing mechanism is provided under said setting section for pushing the plurality of pieces of the wrapped resin, which are formed into inverted U-shapes and which have been piled in said magazine, upward, and
wherein said resin feeding mechanism further includes a turning chuck provided under said setting section, said turning chuck for turning and holding the wrapped resin, which has been pushed upward from said magazine by said pushing mechanism, said turning chuck linking with action of said film forming mechanism to form the extended sections of the wrapped resin flatwise.

5. The automatic molding machine according to claim 1 or 2,
wherein said magazine has an accommodating throughhole in which the plurality of pieces of the wrapped resin can be piled in one direction.

6. The automatic molding machine according to claim 1 or 2,
wherein said film forming mechanism gradually spreads the extended section of the wrapping film to form flatwise from a mid portion to end portions.

7. The automatic molding machine according to claim 1 or 2, wherein said conveying mechanism includes a resin take-out head, whose moving direction is generally parallel to the direction of feeding said release film, and from which disused resin from said molding dies is removable.

8. The automatic molding machine according to claim 1 or 2,
wherein said conveying mechanism includes a degating section for removing disused resin from the molded product.

9. The automatic molding machine according to claim 1 or 2,
wherein said resin feeding head includes means for holding the resin of the wrapped resin at a predetermined position when the wrapped resin is held by said resin feeding head.

10. The automatic molding machine according to claim 9,
wherein said holding means includes pinching blocks, which pinch both sides of the resin of the wrapped resin to put a lower section of the wrapped resin into the pot.

11. The automatic molding machine according to claim 9,
further comprising driving means for setting the wrapped resin into the pot by the steps of: moving said holding means, which is holding the wrapped resin, to a position corresponding to the pot; inserting the lower part of the wrapped resin into the pot; and making said holding means release the wrapped resin to set the same in the pot.

12. The automatic molding machine according to claim 1 or 2,
wherein said molding dies are an upper die and a lower die, and
wherein said film feeding mechanism includes:
feeding reels respectively feeding the release film to said upper die and lower die; and
collecting reels respectively collecting the disused release film from said upper die and lower die.

13. The automatic molding machine according to claim 1 or 2,
wherein said film feeding mechanism collects the disused release film in an accommodating section without winding around a reel.

14. The automatic molding machine according to claim 1 or 2,
wherein said film feeding mechanism includes a pinch roller, provided on the film feeding side for feeding the release film.

15. The automatic molding machine according to claim 1 or 2,
wherein said film feeding mechanism includes press rollers, provided on the film collecting side for collecting the release film.

16. The automatic molding machine according to claim 1 or 2,
wherein said film feeding mechanism includes a sensor for detecting the position of the release film while feeding the release film.

17. An automatic molding machine, comprising:
first and second molding dies for cooperating with each other;
a press mechanism, said molding dies being attached to said press mechanism, said press mechanism clamping and molding a work piece set in said molding dies in a longitudinal direction;
a plurality of molding sections formed in each of the molding dies, said plurality of molding sections arranged linearly with respect to the longitudinal direction of the work piece, the molding sections of the first molding die cooperating with the molding sections of the second molding die;
a film feeding mechanism for linking with molding action of said press mechanism, said film feeding mechanism for feeding release film, formed into a long belt form, to a prescribed length so as to correspond to a setting position of said work piece set in said molding dies, the release film being fed in the longitudinal direction of the work piece, said film feeding mechanism including a feeding head for pinching the release film, mounted to reciprocatively move in the direction of feeding film to feed the release film; and
a conveying mechanism for linking with the molding action of said press mechanism, said conveying mechanism feeding said work piece and resin into said molding die and taking out a molded product therefrom, said conveying mechanism having a work feeding head mounted for moving in a direction generally perpendicular to the feeding direction of the release film,
wherein said work piece is molded by said molding dies whose molding sections are covered with the release film, a plurality of linearly arranged resin molded sections being formed in the work piece from the resin entering the plurality of molding sections formed in the molding dies.

18. An automatic molding machine, comprising:

first and second molding dies for cooperating with each other;

a press mechanism, said molding dies being attached to said press mechanism, said press mechanism clamping and molding a work piece set in said molding dies in a longitudinal direction;

a plurality of molding sections formed in each of the molding dies, said plurality of molding sections arranged linearly with respect to the longitudinal direction of the work piece, the molding sections of the first molding die cooperating with the molding sections of the second molding die;

a film feeding mechanism for linking with molding action of said press mechanism, said film feeding mechanism for feeding release film, formed into a long belt form, to a prescribed length so as to correspond to a setting position of said work piece set in said molding dies, the release film being fed in the longitudinal direction of the work piece, said film feeding mechanism including a feeding head for pinching the release film, mounted to reciprocatively move in the direction of feeding film to feed the release film; and a conveying mechanism for linking with the molding action of said press mechanism, said conveying mechanism feeding said work piece and resin for molding into said molding die and taking out a molded product therefrom, said conveying mechanism having a work feeding head mounted for moving in a direction generally parallel to the feeding direction of the release film, wherein said work piece is molded by said molding dies whose molding sections are covered with the release film, a plurality of linearly arranged resin molded sections being formed in the work piece from the resin entering the plurality of molding sections formed in the molding dies.

\* \* \* \* \*